(12) United States Patent
Zeng et al.

(10) Patent No.: US 12,086,261 B2
(45) Date of Patent: *Sep. 10, 2024

(54) DISPLAYING CYBER THREAT DATA IN A NARRATIVE-LIKE FORMAT

(71) Applicant: International Business Machines Corporation, Armonk, NY (US)

(72) Inventors: Tina L Zeng, Montebello, CA (US); Nathan Sherwood, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 542 days.

This patent is subject to a terminal disclaimer.

(21) Appl. No.: 16/817,831

(22) Filed: Mar. 13, 2020

(65) Prior Publication Data

US 2021/0286879 A1 Sep. 16, 2021

(51) Int. Cl.
*G06F 21/57* (2013.01)
*G06F 9/451* (2018.01)

(52) U.S. Cl.
CPC ............ *G06F 21/577* (2013.01); *G06F 9/453* (2018.02); *G06F 2221/034* (2013.01)

(58) Field of Classification Search
CPC .. G06F 21/577; G06F 9/453; G06F 2221/034; G06F 9/451; G06F 21/552
See application file for complete search history.

(56) References Cited

U.S. PATENT DOCUMENTS

| | | | | | |
|---|---|---|---|---|---|
| 5,701,137 | A | * | 12/1997 | Kiernan | ................. G06F 9/451 715/854 |
| 7,496,594 | B1 | * | 2/2009 | Cummings | ............ G06F 9/451 717/121 |
| 7,814,437 | B2 | * | 10/2010 | Marchev | ................. G06F 9/451 715/810 |

(Continued)

FOREIGN PATENT DOCUMENTS

| | | | | | |
|---|---|---|---|---|---|
| CA | 2844845 | A1 | * | 9/2014 | ............ G05B 15/02 |
| CN | 100383788 | C | * | 4/2008 | |

(Continued)

OTHER PUBLICATIONS

Farhan Sadique, Automated Structured Threat Information Expression (STIX) Document Generation with Privacy Preservation, Published in: 2018 9th IEEE Annual Ubiquitous Computing, Electronics & Mobile Communication Conference (UEMCON), (Year: 2018).*

(Continued)

*Primary Examiner* — Shahriar Zarrineh
(74) *Attorney, Agent, or Firm* — Stephen J. Walder, Jr.; Anthony Pallone

(57) ABSTRACT

A mechanism is provided in a data processing system for displaying cyber threat data in a narrative format. The mechanism receives a cyber threat information file that comprises cyber threat data in a serialized format. The mechanism generates a user interface presenting the cyber threat data in a narrative format. The user interface presents objects in the cyber threat data in a hierarchical format (Continued)

indicative of relationships between parent objects and child objects and presents context information for each object. The mechanism presents the user interface to an analyst.

20 Claims, 7 Drawing Sheets

(56) References Cited

U.S. PATENT DOCUMENTS

| | | | |
|---|---|---|---|
| 8,126,920 B2* | 2/2012 | Hu | G06F 3/04842 |
| | | | 707/786 |
| 8,191,149 B2* | 5/2012 | Yun | G06F 21/552 |
| | | | 726/25 |
| 8,601,587 B1* | 12/2013 | Powell | G06F 21/552 |
| | | | 726/25 |
| 9,225,730 B1 | 12/2015 | Brezinski | |
| 9,292,695 B1* | 3/2016 | Bassett | G06F 21/577 |
| 9,946,738 B2 | 4/2018 | Meacham et al. | |
| 10,262,133 B1 | 4/2019 | Cohen et al. | |
| 10,348,747 B2* | 7/2019 | Yamada | G06F 16/951 |
| 10,367,839 B2* | 7/2019 | Vora | H04L 63/1425 |
| 10,387,667 B2 | 8/2019 | Koo et al. | |
| 10,521,584 B1 | 12/2019 | Sharifi Mehr | |
| 10,721,239 B2* | 7/2020 | Koottayi | G06N 20/00 |
| 10,749,890 B1* | 8/2020 | Aloisio | G06N 5/025 |
| 10,868,825 B1* | 12/2020 | Dominessy | H04L 63/1433 |
| 10,897,473 B1 | 1/2021 | Ryan et al. | |
| 10,986,117 B1* | 4/2021 | Agbabian | G06F 21/6218 |
| 11,012,466 B2 | 5/2021 | Gilmore et al. | |
| 11,075,953 B2* | 7/2021 | Masuoka | H04L 63/1416 |
| 11,128,654 B1* | 9/2021 | Joyce | H04L 63/20 |
| 11,201,890 B1* | 12/2021 | Coull | H04L 63/1416 |
| 11,277,432 B2* | 3/2022 | Hassanzadeh | G06F 21/577 |
| 11,483,319 B2* | 10/2022 | Okunlola | G06N 7/01 |
| 11,657,088 B1* | 5/2023 | Acheson | G06F 16/90335 |
| | | | 707/741 |
| 2005/0240901 A1* | 10/2005 | McKnight | G06F 9/451 |
| | | | 717/110 |
| 2007/0067845 A1 | 3/2007 | Wiemer et al. | |
| 2008/0115221 A1* | 5/2008 | Yun | G06F 21/552 |
| | | | 726/25 |
| 2009/0024555 A1 | 1/2009 | Rieck et al. | |
| 2010/0023598 A9* | 1/2010 | Ginter | H04L 63/1425 |
| | | | 709/227 |
| 2011/0307435 A1 | 12/2011 | Overrell et al. | |
| 2014/0172708 A1 | 6/2014 | Chrapko et al. | |
| 2014/0337974 A1* | 11/2014 | Joshi | H04L 63/1425 |
| | | | 726/23 |
| 2015/0073858 A1* | 3/2015 | Philip | G06F 16/248 |
| | | | 705/7.27 |
| 2015/0244681 A1* | 8/2015 | Blumenfeld | H04L 9/30 |
| | | | 713/168 |
| 2015/0356301 A1* | 12/2015 | Diehl | H04L 41/0893 |
| | | | 726/22 |
| 2016/0191560 A1 | 6/2016 | Pegna et al. | |
| 2016/0308890 A1* | 10/2016 | Weilbacher | H04L 63/1408 |
| 2016/0330226 A1* | 11/2016 | Chen | H04L 29/06877 |
| 2016/0359898 A1* | 12/2016 | Lewis | H04L 63/1433 |
| 2016/0366174 A1* | 12/2016 | Chernin | H04L 67/1097 |
| 2017/0048270 A1 | 2/2017 | Boyadjiev et al. | |
| 2017/0099312 A1* | 4/2017 | Ganame | G06N 20/00 |
| 2017/0132814 A1* | 5/2017 | Liu | G06F 9/451 |
| 2017/0155671 A1* | 6/2017 | Hovor | H04L 63/14 |
| 2017/0230412 A1* | 8/2017 | Thomas | H04L 63/1416 |
| 2017/0331851 A1 | 11/2017 | Piney Wood et al. | |
| 2017/0364702 A1 | 12/2017 | Goldfarb et al. | |
| 2018/0004942 A1* | 1/2018 | Martin | G06F 21/554 |
| 2018/0046801 A1* | 2/2018 | Falk | G06F 21/56 |
| 2018/0063171 A1 | 3/2018 | Yamada et al. | |
| 2018/0109545 A1 | 4/2018 | Weilbacher | |
| 2018/0159876 A1 | 6/2018 | Park et al. | |
| 2018/0191736 A1* | 7/2018 | Cho | H04L 63/1408 |
| 2018/0219888 A1 | 8/2018 | Apostolopoulos | |
| 2018/0314411 A1 | 11/2018 | Vora | |
| 2018/0329958 A1* | 11/2018 | Choudhury | G06F 16/2456 |
| 2018/0375892 A1* | 12/2018 | Ganor | H04L 63/20 |
| 2019/0028369 A1 | 1/2019 | Wiener et al. | |
| 2019/0068645 A1* | 2/2019 | Masuoka | G06F 16/258 |
| 2019/0156042 A1* | 5/2019 | Kim | G06F 16/258 |
| 2019/0166142 A1* | 5/2019 | Lee | H04L 63/1425 |
| 2019/0166164 A1* | 5/2019 | Yamada | G06F 21/552 |
| 2019/0236661 A1 | 8/2019 | Hogg et al. | |
| 2019/0260764 A1* | 8/2019 | Humphrey | H04L 67/12 |
| 2019/0260804 A1* | 8/2019 | Beck | H04L 63/1433 |
| 2019/0281057 A1 | 9/2019 | McAninch | |
| 2019/0281075 A1* | 9/2019 | Taniguchi | H04L 63/1433 |
| 2019/0334989 A1* | 10/2019 | Kang | G06F 21/53 |
| 2019/0342311 A1 | 11/2019 | Muddu et al. | |
| 2020/0004964 A1* | 1/2020 | Soumenkov | G06F 16/289 |
| 2020/0012741 A1 | 1/2020 | Bracholdt et al. | |
| 2020/0042700 A1 | 2/2020 | Li et al. | |
| 2020/0065482 A1* | 2/2020 | Taniguchi | G06F 21/577 |
| 2020/0084114 A1* | 3/2020 | Keppler | H04L 41/145 |
| 2020/0133473 A1* | 4/2020 | Coble | G06F 3/04842 |
| 2020/0137097 A1 | 4/2020 | Zimmermann et al. | |
| 2020/0234155 A1 | 7/2020 | Ares | |
| 2020/0252415 A1 | 8/2020 | Hamdi | |
| 2020/0358792 A1 | 11/2020 | Bazalgette et al. | |
| 2021/0117476 A1 | 4/2021 | Lee et al. | |
| 2021/0248443 A1* | 8/2021 | Shu | H04L 63/1425 |
| 2021/0248534 A1 | 8/2021 | Ares | |

FOREIGN PATENT DOCUMENTS

| | | | | |
|---|---|---|---|---|
| CN | 105871882 A | | 8/2016 | |
| CN | 106605397 A | | 4/2017 | |
| EP | 2996304 A1 | * | 3/2016 | G06F 21/577 |
| EP | 3588348 A1 | * | 1/2020 | G06F 16/289 |
| EP | 3451615 B1 | * | 11/2020 | G06F 16/258 |
| KR | 1020190070583 A | | 6/2019 | |
| KR | 20190134321 A | * | 12/2019 | |
| KR | 20200018966 A | * | 2/2020 | |
| WO | WO-2016168452 A1 | * | 10/2016 | G06F 16/22 |
| WO | WO-2017024058 A1 | * | 2/2017 | H04L 41/12 |
| WO | WO-2017180057 A1 | * | 10/2017 | G06F 21/554 |

OTHER PUBLICATIONS

Vijayakumar, S., A Unified Data Model for Cyber Threat Intelligence in Operational Technology Networks, Eindhoven University of Technology, Eindhoven, Feb. 2020 (Year: 2020).*

Mohammad Ashraful Huq Shahi, Tactics, Techniques and Procedures (TTPs) to Augment Cyber Threat Intelligence (CTI), St. Cloud State University the Repository at St. Cloud State, May 2018, 78 pages (Year: 2018).*

Sarah Brown, From Cyber Security Information Sharing to Threat Management, WISCS '15: Proceedings of the 2nd ACM Workshop on Information Sharing and Collaborative Security Oct. 2015 pp. 43-49 https://doi.org/10.1145/2808128.2808133 (Year: 2018).*

Fabian Böhm, Graph-based visual analytics for cyberthreat intelligence, Cybersecurity vol. 1, Article No. 16 (2018), Published: Dec. 28, 2018, 19 pages (Year: 2018).*

Xiaodong Zang, Attack scenario reconstruction via fusing heterogeneous threat intelligence, Computers & Security vol. 133, Oct. 2023, 103420, 13 pages (Year: 2023).*

Mohammad Ashraful Huq Shahi, Tactics, Techniques and Procedures (TTPs) to Augment Cyber Threat Intelligence (CTI): A Comprehensive Study, St. Cloud State University the Repository at St. Cloud State, 78 pages (Year: 2018).*

Leslie F. Sikos, Cybersecurity knowledge graphs, Survey Paper Open Access Published: Apr. 29, 2023 vol. 65, pp. 3511-3531 (2023), 21 pages (Year: 2023).*

Sean Barnum, Standardizing Cyber Threat Intelligence Information with the Structured Threat Information expression (STIX™), Version 1.1, Revision 1, Feb. 20, 2014, 22 pages (Year: 2014).*

Otgonpurev Mendsaikhan, "Quantifying the Significance and Relevance of Cyber-Security Text Through Textual Similarity and Cyber-Security Knowledge Graph", Received Sep. 9, 2020, accepted

(56) References Cited

OTHER PUBLICATIONS

Sep. 21, 2020, date of publication Sep. 28, 2020, date of current version Oct. 8, 2020, 12 pages (Year: 2020).*

List of IBM Patents or Patent Applications Treated as Related (Appendix P), Mar. 13, 2020, 2 pages.

Bodeau, Deborah et al., "Cyber Prep 2.0. Motivating Organizational Cyber Strategies in Terms of Preparedness", The MITRE Corporation, May 2017, 82 pages.

Ginn, Jane, "Cyber Threat Analysis. Using a Robust Platform for Training Purposes,", A Collaboration Between: CYBER and ECLECTIC IQ (White Paper) Aug. 2017, 17 pages.

Islam, Chadni et al., "A Multi-Vocal Review of Security Orchestration", ACM Computing Surveys (CSUR) 52.2 (2019): 37, 38 Pages.

Morin, Matthew E., "Protecting networks via automated defense of cyber systems", Naval Postgraduate School Monterey United States, Sep. 2016, 87 pages.

Riebe, Thea et al., "Threat Intelligence Application for Cyber Attribution", Science Peace Security '19, Proceedings of the Interdisciplinary Conference on Technical Conference on Technical, Sep. 2019, 5 pages.

Tosh, Deepak K., "Market Based Models for CYBersecurity information EXchange (CYBEX)", University of Nevada Reno, A dissertation submitted in partial fulfillment of the requirements for the degree of Doctor of Philosophy in Computer Science and Engineering, Aug. 2016, 187 pages.

Woods, Bronwyn et al., "Data Mining for Efficient Collaborative Information Discovery", Proceedings of the 2nd ACM Workshop on Information Sharing and Collaborative Security. ACM, Oct. 2015, 10 pages.

* cited by examiner

*FIG. 3*

```
300  {
       "id": "observed-data—89512854-6f92-449e-a44e03db85a34a4b",
       "type": "observed-data",
       "created_by_ref": "identity—3796952d-1054-4474-aee1-dcc731418b29",
       "objects": {
         "0": {
           "type": "file",
           "hashes": {
             "MD5": "db629263698f75f3fe66e5e30be10fa0"
           },
           "name": "repmgr.exe"
         },
         "1": {
           "type": "process",
           "command_line": "\"C:\\Program Files\\Confer\\RepMgr.exe\"",
           "created": "2019-04-28T18:29:46.85Z",
           "opened_connection_refs": [
             "6"
           ],
           "pid": 1016,
           "creator_user_ref": "8",
           "name": "repmgr.exe",
           "binary_ref": "0",
           "parent_ref": "3"
         },
         "2": {
           "type": "file",
           "name": "services.exe",
           "hashes": {
             "MD5": "00000000000000000000000000000000"
           }
         },
         "3": {
           "type": "process",
           "name": "services.exe",
           "binary_ref": "2",
           "child_refs": ["1"]
           "pid": 572
         },
         "4": {
           "type": "domain-name",
           "value": "iestestmachine1"
         },
         "5": {
           "type": "ipv4-addr",
           "value": "193.86.73.109"
         },
         "6": {
           "type": "network-traffic",
           "dst_ref": "7",
           "src_ref": "5"
         },
         "7": {
           "type": "ipv4-addr",
           "value": "192.168.0.25"
         },
         "8": {
           "type": "user-account",
           "user_id": "SYSTEM"
         }
       },
       "created": "2019-04-28T18:29:46.85Z",
       "modified": "2019-04-28T18:29:46.85Z",
       "first_observed": "2019-04-28T18:29:46.85Z",
       "last_observed": "2019-04-28T18:29:46.85Z",
       "number_observed": 1
     }
```

FIG. 5

```
500 {
     "id: "observed-data—89512854-6f92-449e-a44e03db85a34a4b",
     "type": "observed-data",
     "created_by_ref": "identity—3796952d-1054-4474-aee1-dcc731418b29",
     "objects": {
       "0": {
         "type": "file",
         "hashes": {
           "MD5": "db629263698f75f3fe66e5e30be10fa0"
         },
         "name": "repmgr.exe"
       },
       "1": {
         "type": "process",
         "command_line": "\"C:\\Program Files\\Confer\\RepMgr.exe\"",
         "created": "2019-04-28T18:29:46.85Z",
         "opened_connection_refs": [
           "6"
         ],
         "pid": 1016,
         "creator_user_ref": "8",
         "name": "repmgr.exe",
         "binary_ref": "0",
         "parent_ref": "3"
       },
       "2": {
         "type": "file",
         "name": "services.exe",
         "hashes": {
           "MD5": "00000000000000000000000000000000"
         }
       },
       "3": {
         "type": "process",
         "name": "services.exe",
         "binary_ref": "2",
         "child_refs": ["1"],
         "pid": 572
       },
       "4": {
         "type": "domain-name",
         "value": "iestestmachine1"
       },
       "5": {
         "type": "ipv4-addr",
         "value": "193.86.73.109"
       },
       "6": {
         "type": "network-traffic",
         "dst_ref": "7",
         "src_ref": "5"
       },
       "7": {
         "type": "ipv4-addr",
         "value": "192.168.0.25"
       },
       "8": {
         "type": "user-account",
         "user_id": "SYSTEM"
       }
     },
     "created": "2019-04-28T18:29:46.85Z",
     "modified": "2019-04-28T18:29:46.85Z",
     "first_observed": "2019-04-28T18:29:46.85Z",
     "last_observed": "2019-04-28T18:29:46.85Z",
     "number_observed": 1
   }
```

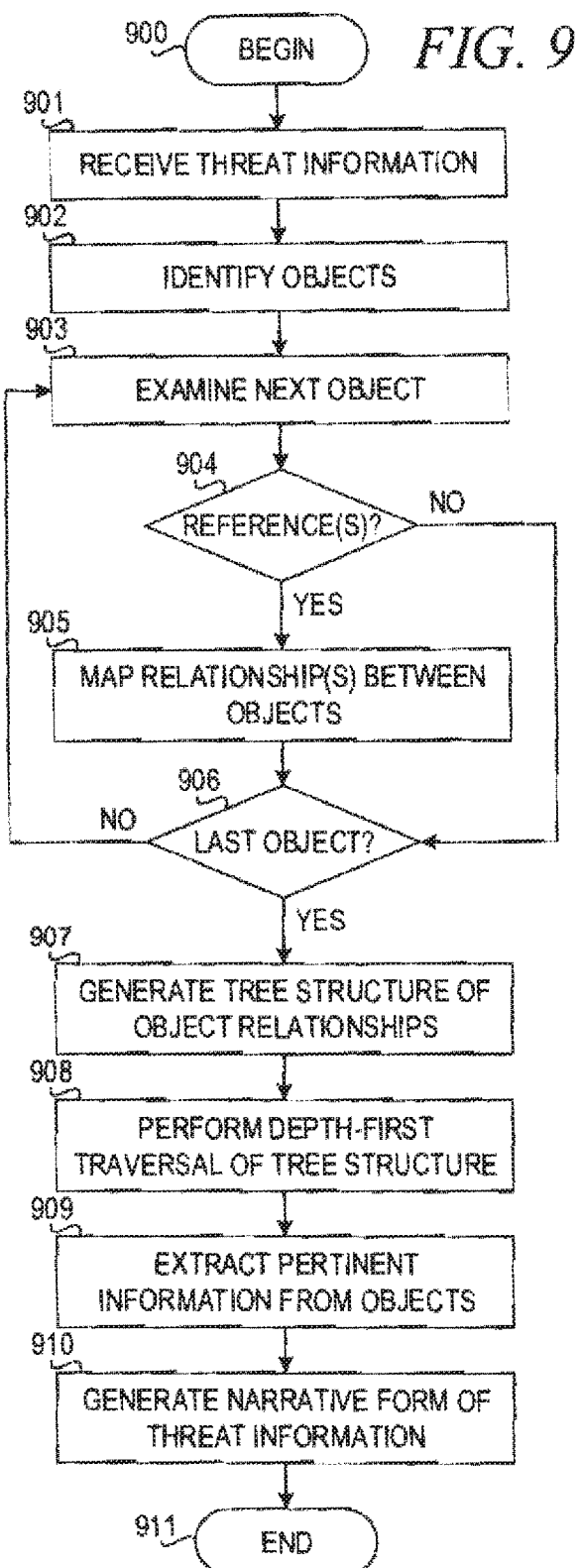

DISPLAYING CYBER THREAT DATA IN A NARRATIVE-LIKE FORMAT

BACKGROUND

The present disclosure relates generally to an improved data processing apparatus and method and more specifically to mechanisms for displaying cyber threat data in a narrative-like format to increase understanding.

In computers and computer networks, an attack is any attempt to expose, alter, disable, destroy, steal or gain unauthorized access to or make unauthorized use of an asset. A cyberattack is any type of offensive maneuver that targets computer information systems, infrastructures, computer networks, or personal computer devices. An attacker is a person or process that attempts to access data, functions or other restricted areas of the system without authorization, potentially with malicious intent. Depending on context, cyberattacks can be part of cyberwarfare or cyberterrorism. A cyberattack can be employed by sovereign states, individuals, groups, society or organizations, and it may originate from an anonymous source.

A cyberattack may steal, alter, or destroy a specified target by hacking into a susceptible system. Cyberattacks can range from installing spyware on a personal computer to attempting to destroy the infrastructure of entire nations. Legal experts are seeking to limit the use of the term to incidents causing physical damage, distinguishing it from the more routine data breaches and broader hacking activities.

Threat data is a raw summary of malicious domains, hash values or IP addresses, and consequently it is data that does not provide any context on cyber threats or attacks whatsoever. Threat data is typically available in large volumes and describes individual and unarguable facts.

Cyber threat intelligence is organized, analyzed and refined information about potential or current security attacks that threaten an organization. The primary purpose of threat intelligence is to help organization understand their threat landscape and the risks they are potentially exposed to, internal or external. Threat data becomes threat intelligence when it is enriched with threat context in order to produce actionable and relevant information to enable companies to align their business and security strategies and goals.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided in a data processing system for displaying cyber threat data in a narrative format. The method comprises receiving a cyber threat information file, wherein the cyber threat data file comprises cyber threat data in a serialized format. The method further comprises generating a user interface presenting the cyber threat data in a narrative format. The user interface presents objects in the cyber threat data in a hierarchical format indicative of relationships between parent objects and child objects and presents context information for each object. The method further comprises presenting the user interface to an analyst.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 3 depicts an example of a serialized cyber threat data file in accordance with an illustrative embodiment;

FIG. 5 depicts the cyber threat data file with all relationships marked in accordance with an illustrative embodiment;

FIG. 9 is a flowchart illustrating operation of a mechanism for displaying cyber threat data in a narrative format in accordance with an illustrative embodiment.

DETAILED DESCRIPTION

Figure 1:
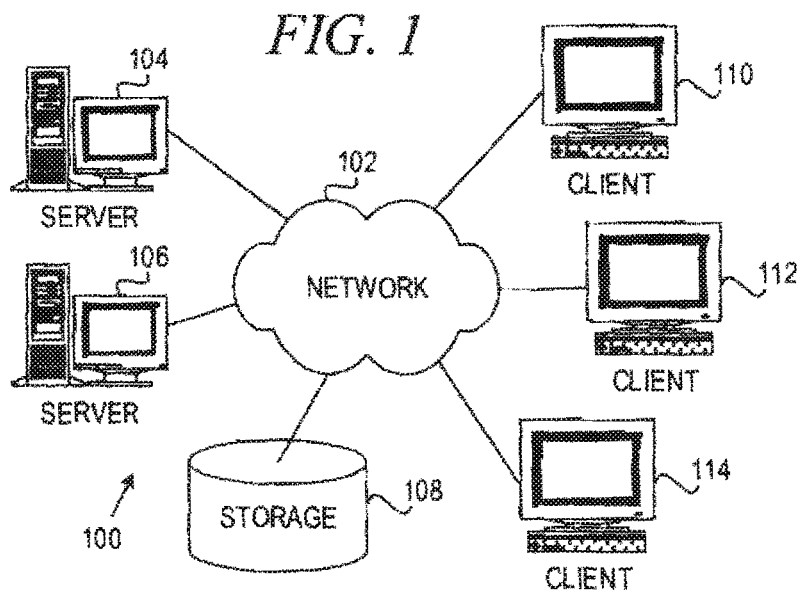
FIG. 1 is an example diagram of a distributed data processing system in which aspects of the illustrative embodiments may be implemented.

Even though threat data does have its uses, the benefits of it are limited in the absence of context to enable security teams to make informed decisions. In order to utilize threat intelligence, an organization should have a clear idea of its end goal, and how this can be achieved by introducing threat data into their security programs. The failure to do this properly will result in any threat intelligence program delivering little real value, with vast amounts of data being generated with little or no significant benefit. Threat data feeds are a core part of a threat intelligence program, although it's important to bear in mind that not all sources are created equally.

When a security incident happens, specialists usually know very little about its severity and scope. Their knowledge is usually limited to an alert or indicator, which needs to be enriched with context and intelligence, so that specialists can determine the full scope of the incident. The security team must assess and triage each single event and establish its severity in order to determine whether it needs further investigation. The security team usually relies on threat intelligence to establish the scope of the incident and the potential damage. For example, a single alert about a file may contain only a hash indicator. While manual analysis can reveal other indicators, such activity would take a lot of time. Instead, a better approach would be to incorporate an automated threat intelligence enrichment system.

Incorporating an automated approach can do the same work in just seconds. Automated threat intelligence enrichment can be used to implement repeatable and predictable processes that are fast, effective, and efficient. This method also releases specialists from time-consuming and error-prone tasks of data gathering and data verifying, which gives them more free time for analysis and threat hunting.

It is becoming increasingly necessary for organizations to have a cyber threat intelligence capability and a key component of success for any such capability is information sharing with partners, peers and others they select to trust. While cyber threat intelligence and information sharing can help focus and prioritize the use of the immense volumes of complex cyber security information organizations face today, they have a foundational need for standardized, structured representations of this information to make it tractable. The Structured Threat Information expression (STIX™) language and format is a quickly evolving, collaborative, community-driven effort to define and develop a language to represent structured threat information. The STIX™ language is meant to convey the full range of cyber threat information and strives to be fully expressive, flexible, extensible, automatable, and as human-readable as possible. Though relatively new and still evolving, it is actively being adopted or considered for adoption by a wide range of cyber threat-related organizations and communities around the world. STIX is a trademark of The MITRE Corporation.

Security analysts read hundreds of search results in their daily workflows in order to compare results from other data sources to understand results. Even if the data is serialized in the security industry language and format, such as the STIX™ language, analysts must spend time learning how to read the formatted data so that they can manually match observed data to direct relationships. This is because serialized cyber threat data do not display these relationships in a logical order, forcing analysts to read through the entire file and match each individual piece of observable data to other data. These relationships connect the various pieces of observed data together for the analyst to understand the context around the data.

The illustrative embodiment provides a mechanism for displaying cyber threat data in a narrative format to increase understanding. The mechanism resolves relationships to build a data structure to represent the relationships in a tree structure. Then, the mechanism traverses this tree data structure to generate a narrative format display of the cyber threat data.

The narrative format display of the illustrative embodiment supports a range of use cases involved in cyber threat management. For example, as a first use case, a cyber threat analyst reviews information regarding cyber threat activity from a variety of input sources. The analyst seeks to understand the nature of relevant threats, identify them, and fully characterize them such that the relevant knowledge of the threat can be fully expressed and evolved over time. This relevant knowledge includes threat-related actions, behaviors, capabilities, intents, attributed actors, etc. From this understanding and characterization, the analyst may then specify relevant threat indicator patterns, suggest courses of action for threat response activities, or share the information with other trusted parties. When cyber threat data are presented in a serialized format, the relationships between objects are not self-evident, and the analyst must analyze hundreds of objects to identify relevant threats. The narrative format display of the illustrative embodiment presents these relationships in a format that is easier for the analyst to understand, thus reducing the potential for human error.

As another example use case, a cyber threat analyst specifies measurable patterns representing the observable characteristics of specific cyber threats along with their threat context and relevant metadata for interpreting, handling, and applying the pattern and its matching results. In another use case, cyber decision makers and cyber operations personnel work together to prevent or detect cyber threat activity and to investigate and respond to any detected incidences of such activity. Preventable courses of action may be remedial in nature to mitigate vulnerabilities, weaknesses, or misconfigurations that may be targets of exploit. After detection and investigation of specific incidents, reactive courses of action may be pursued. The narrative format display of the illustrative embodiment improves cyber threat prevention, detection, and response by presenting the relationships between objects with relevant context, thus improving understanding of the cyber threat data.

The narrative format display of the illustrative embodiment also improves the ability to share cyber threat information with sharing communities by assisting a cyber threat analyst in determining what to share and with whom, thus improving the ability of those communities to detect, prevent, and respond to cyber threats.

Before beginning the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with an engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM). an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments. electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
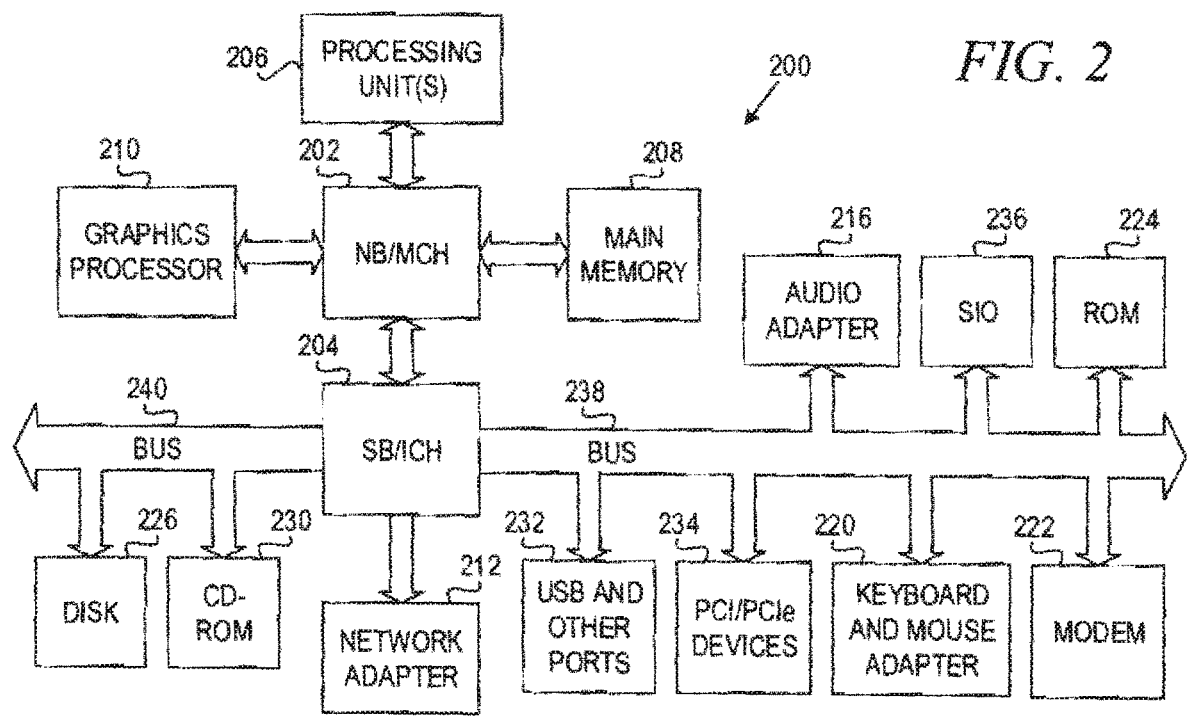
FIG. 2 is an example block diagram of a computing device in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement a mechanism for generating a display of cyber threat data in a narrative-like format for increased understanding. The configuring of the computing device may comprise the providing of application specific hardware, firmware, or the like to facilitate the performance of the operations and generation of the outputs described herein regarding the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general-purpose computing device. Moreover, as described hereafter, the implementation of the mechanisms of the illustrative embodiments improves the functionality of the computing device and provides a useful and concrete result that facilitates displaying cyber threat data in a narrative-like format.

As noted above, the mechanisms of the illustrative embodiments utilize specifically configured computing devices, or data processing systems, to perform the operations for displaying cyber threat data in narrative format. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O)) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft Windows 10®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor-based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter regarding displaying cyber threat data in narrative form.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

The illustrative embodiments provide mechanisms for displaying direct relationships found in cyber threat data in a narrative way to decrease the time it takes analysts to read and understand the query results data. This diminishes the time-to-value for analysts, because it removes the cognitive load of learning how to read the data formatted in a language, such as the STIX™ cyber threat data language, and having to read through the entire file to match each individual piece of data to its various relationships.

FIG. 3 depicts an example of a serialized cyber threat data file in accordance with an illustrative embodiment. In the depicted example, cyber threat data file 300 is in the STIX™ cyber threat data language. Certain STIX™ object types include object references, which can have a singleton or a list of relations. Singleton object references always end with "an_ref" and lists will end with "_refs." Today, analysts still need to manually map these objects to the other referenced objects to understand which object is related to which other objects by reading the data. Furthermore, the STIX™ language does not display these relationships in a logical order, thus forcing the viewer to scan the entire data file.

Figure 4:
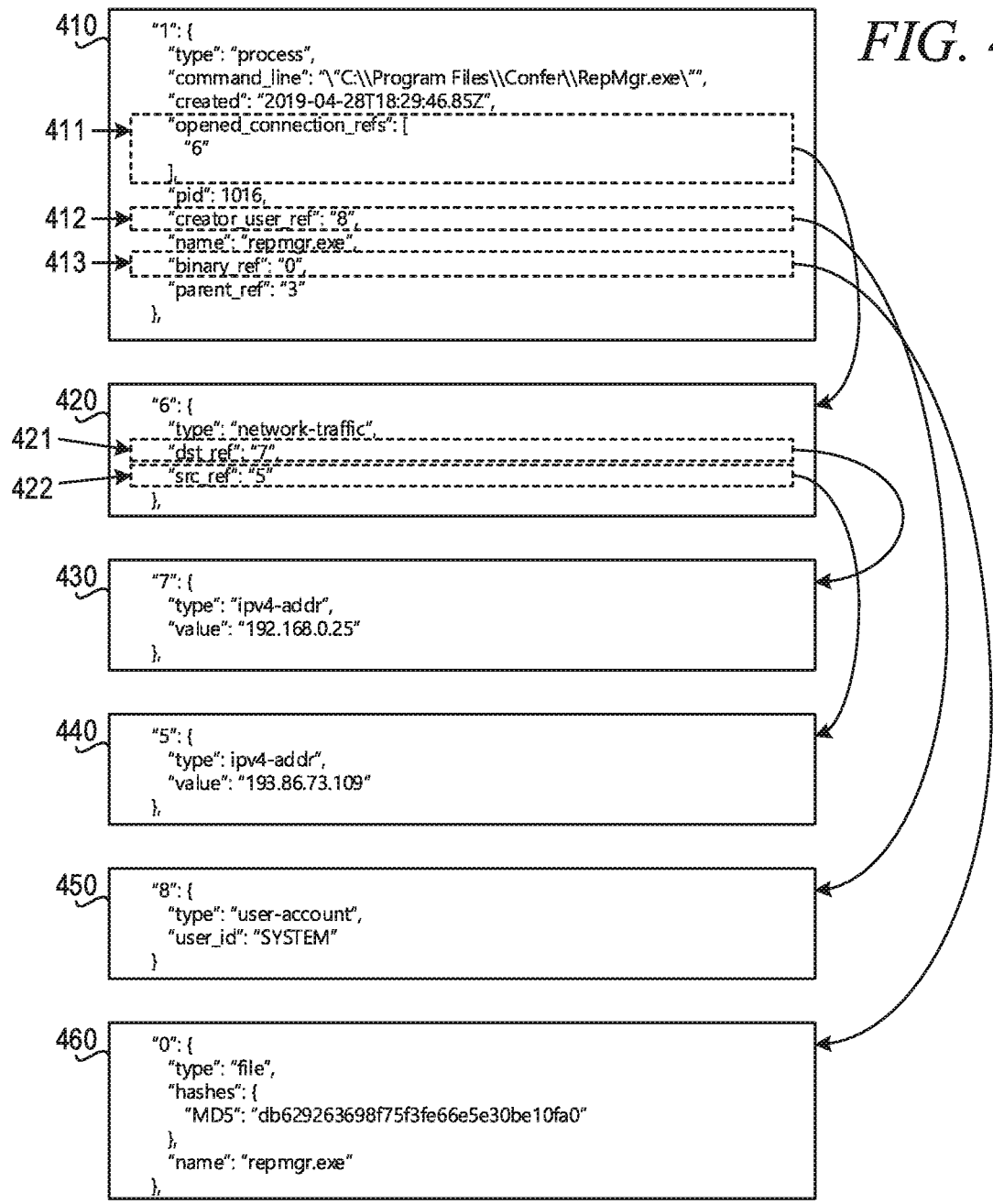
FIG. 4 represents relationships between objects in a cyber threat data file in accordance with an illustrative embodiment.

FIG. 4 represents relationships between objects in a cyber threat data file in accordance with an illustrative embodiment. In the depicted example, object 410 is labeled "1" and includes references 411-413. More specifically, reference 411 is an opened connection reference that references object 420, labeled as "6"; reference 412 is a creator user reference that references object 450, labeled as "8"; and, reference 413 is a binary reference that references object 460, labeled as "0".

In turn, object 420 is labeled "6" and includes references 421, 422. More specifically, reference 421 is a destination reference that references object 430, labeled as "7"; and, reference 422 is a source reference that references object 440, labeled as "5".

FIG. 4 depicts only a subset of the objects in cyber threat data file 300 in FIG. 3. Given that analysts routinely review hundreds of query results, it is computationally infeasible for analysts to manually map more than a dozen relationships without error. FIG. 5 depicts the cyber threat data file with all relationships marked in accordance with an illustrative embodiment. As can be seen in cyber threat data file 500 shown in FIG. 5, the number of relationships between objects an analyst must map can become unmanageable. The illustrative embodiment provides a mechanism for generating a narrative-like format to allow analysts to read and understand large numbers of results and to compare the results in the analysts' daily workflows. The illustrative embodiment visually displays the relationships already mapped to their respective references and displays these relationships in a narrative way to highlight the relationships in a hierarchical way to help with legibility and to increase understanding.

Figure 6:
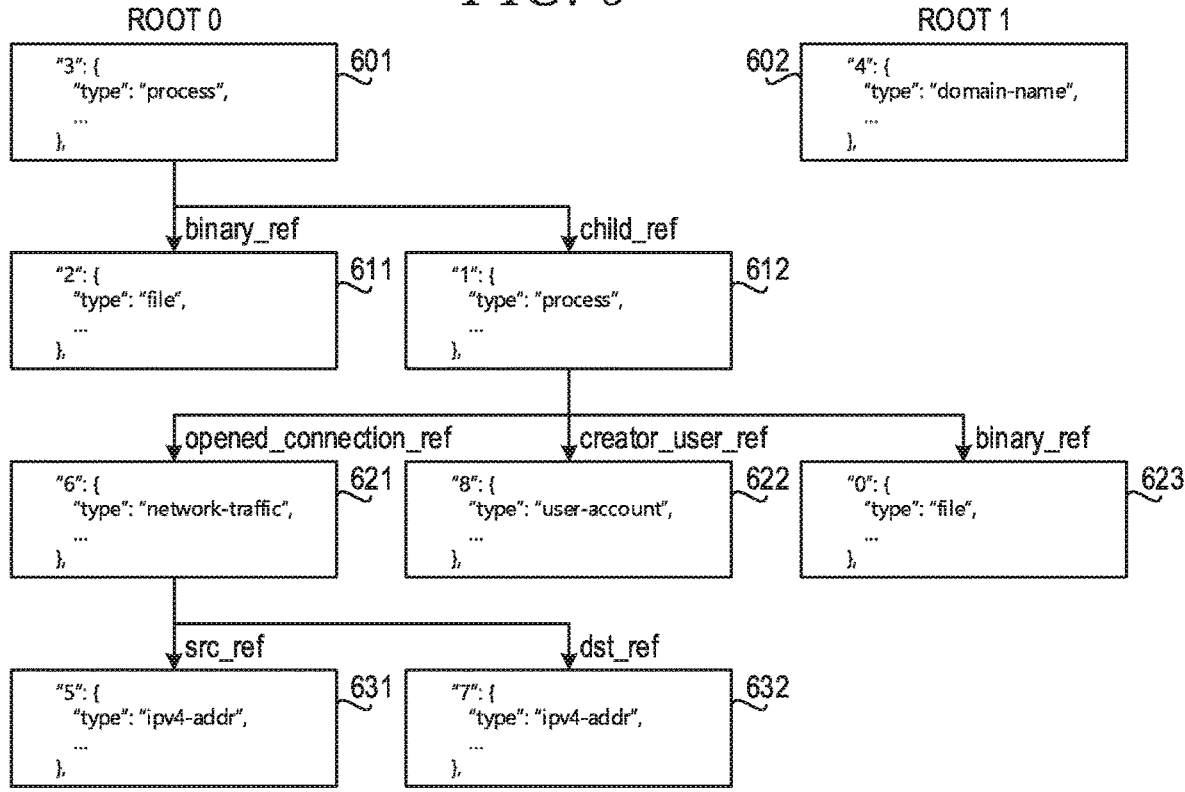
FIG. 6 depicts an example tree data structure representing relationships between objects in a cyber threat data file in accordance with an illustrative embodiment.

The illustrative embodiment uses known keys to build a tree structure for representing the data. To achieve this, the mechanism of the illustrative embodiment programmatically reconstructs the data into a tree data structure. FIG. 6 depicts an example tree data structure representing relationships between objects in a cyber threat data file in accordance with an illustrative embodiment.

Returning to FIG. 5, the mechanism of the illustrative embodiment traverses the serial cyber threat data file 500, beginning with the first object, labeled as object "0". In this example, object "0" does not have any references to other objects. This object "0" is temporarily considered a stand-alone object.

Then, the mechanism proceeds to object "1", which includes an opened connection reference to object "6", a creator user reference to object "8", and a binary reference to object "3". Thus, the mechanism establishes a first hierarchical relationship with object "1" as the parent and object "6" as the child, a second hierarchical relationship with object "1" as the parent and object "8" as the child, and a third hierarchical relationship with object "1 as the parent and object "0" as the child. In FIG. 6, object "1" is shown as object 612, object "6" is shown as object 621, and the relationship type is shown as "opened_connection_ref"; object "8" is shown as object 622, and the relationship type is shown as "creater_user_ref"; and, object "0" is shown as object 623 with the relationship type shown as "binary_ref." Thus, object "0" is no longer considered a stand-alone object.

The mechanism then considers object "2" in cyber threat data file 500. This object does not have any references to other objects and is temporarily considered a stand-alone object.

The mechanism considers object "3" in cyber threat data file 500. This object has references to objects "2" and "1". The mechanism then establishes a first hierarchical relationship with object "3" as the parent and object "2 as the child and a second hierarchical relationship with object "3" as the parent and object "1" as the child. In FIG. 6, object "3" is shown as object 601, object "2" is shown as object 611, and the relationship type is shown as "binary_ref." Thus, object "2" is no longer a stand-alone object. Also, in FIG. 6, the relationship type between object "3" 601 and object "1" 612 is shown as "child_ref." As can be seen in cyber threat data file 500, object "1" references object "3" as a parent reference, and object "3" references object "1" as a child reference.

Next, the mechanism considers object "4" in cyber threat data file 500. This object does not have any references to other objects and, as will be seen, is not referenced by any other objects. Thus, object "4" is a stand-alone object, shown in FIG. 6 as object 602 and "ROOT 1."

Then, the mechanism considers object "5" in cyber threat data file 500. This object does not have any references to other objects and is temporarily considered as a stand-alone object.

The mechanism proceeds to consider object "6" in cyber threat data file 500. This object references objects "5" and "7". The mechanism then establishes a first hierarchical relationship with object "6" as the parent and object "5" as the child and establishes a second hierarchical relationship with object "6" as the parent and object "7" as the child. In FIG. 6, object "6" is shown as object 621, object "5" is shown as object 631, and the relationship type is shown as "src_ref." Also, in FIG. 6, object "7" is shown as object 632, and the relationship type between object "6" 621 and object "7" 632 is shown as "dst_ref."

The mechanism next considers object "7" in cyber threat data file 500. This object does not have any references to other objects. However, like object "5", this object is now in a hierarchical relationship with object "6" in the tree data structure of FIG. 6. Similarly, object "8" in cyber threat data file 500 does not have any references to other objects, but object "8" is in a hierarchical relationship as the child of object "1" 612 in the tree data structure of FIG. 6.

In this manner, the tree data structure of FIG. 6 is generated. After all objects are considered, the result is that object "3" 601 is the root, shown as "ROOT 0" in FIG. 6. This is a process that is impractical for an analyst to perform entirely in the human mind when reading file 500 in FIG. 5, particularly considering a given cyber threat data file may comprise hundreds of objects.

The mechanism of the illustrative embodiment defines nodes in the tree structure as follows:

```
// Tree Node
static class Node {
    object objectData; // Non reference data
    int objectkey; //
    string edgeType; // The type of reference from the parent
        to the child. Null if root.
    List<Node>childrenList=new ArrayList<Node>( ); //
        List of children
    Node(object data, int key)
    {
        this.objectData=data;
        this.objectkey=key
    }
}
```

Objects without references are either leaf nodes or have no references and are considered single-node trees. First, the mechanism initializes a list of root nodes representing each observed data. Then, the mechanism iterates over the list of nodes connecting it to its children by comparing any reference keys to the other remaining root node keys, while updating their edge type. Anything without an edge type at the end is the top of a tree and can be traversed to display the narrative display of the data.

Figure 7:
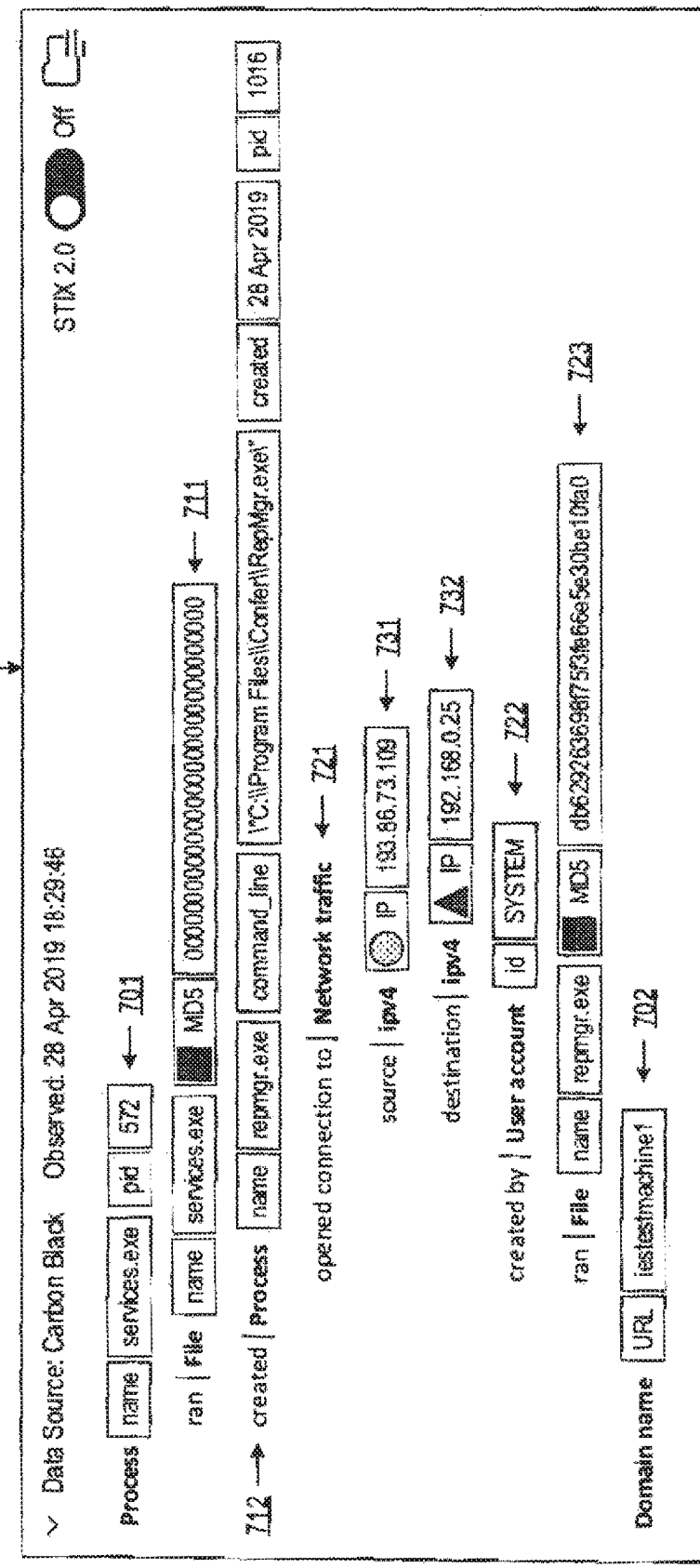
FIG. 7 depicts an example user interface that displays cyber threat information in a narrative format in accordance with an illustrative embodiment.

FIG. 7 depicts an example user interface that displays cyber threat information in a narrative format in accordance with an illustrative embodiment. User interface 700 presents cyber threat data received from a given data source in a narrative format. In the depicted example, user interface 700 presents the cyber threat data shown in FIG. 3 and as represented in the tree structure of FIG. 6. The display begins with the root node 601 in FIG. 6, shown on line 701. In this instance, line 701 represents a process with context information about the process, including the name of the process and the process identifier (pid).

The mechanism then performs a depth-first search of the tree shown in FIG. 6, and object 601 has a relationship with object 611 indicating that the process of object 601 ran the file of object 611. Line 711 in user interface 700 represents the file object and indicates that the process of line 701 ran the file of line 711. In addition, line 711 presents context information for the file, including the file name and a file hash. The MD5 message-digest algorithm is a type of hashing algorithm that can be used to identify a file. MD5 and other hashes can be used in threat information knowledge lookups to see if the identified files are malicious. Other properties of a file may include at least the following:

extensions: dictionary;
size: the size of the file, in bytes;
name_enc: the observed encoding for the name of the file;
magic_number_hex: the hexadecimal constant ("magic number") associated with a specific file format that corresponds to the file;
mime_type: the Multipurpose Internet Mail Extensions (MIME) type name specified for the file;
created: the date/time the file was created;
modified: the date/time the file was last written to or modified;
accessed: the date/time the file was last accessed;
parent_directory_ref: the parent directory of the file, as a reference to a Directory Object;
is_encrypted: a Boolean that specifies whether the file is encrypted;
encryption_algorithm: the name of the encryption algorithm used to encrypt the file;
decyption key: the decryption key used to decrypt the file;
contains_ref: the list of references to other observable objects contained within the file, such as another file that is appended to the end of the file, or an IP address that is contained somewhere in the file;
content_ref: the content of the file, represented as an Artifact Object.

Since object 611 is a leaf node in the tree data structure of FIG. 6, the depth-first search then proceeds to object 612, which represents a child process spawned by object 601. Line 712 in user interface 700 represents the child process and indicates that the process from line 701 created the process of line 712. Line 712 also presents context information for the process, including name, "command_line" (the command used to trigger the process, the date/time the process was created, and the process identifier (pid).

Other properties of a process may include at least the following:

extensions: dictionary;
is_hidden: a Boolean field that specifies whether the process is hidden;
cwd: a string that specifies the current working directory of the process;
arguments: the list of arguments used in executing the process;
environmental_variables: the list of environment variables associated with the process as a dictionary.

The depth-first search proceeds to object 721, which represents a connection opened by the process of object 712. Line 721 represents the opened connection to network traffic. Properties of the network traffic object may include at least the following:

start: the date/time the network traffic was initiated, if known;
end: the date/time the network traffic ended, if known;
is_active: a Boolean indicating whether the network traffic is still ongoing;
src_port: the source port used in the network traffic;
dst_port: the destination port used in the network traffic;
protocols: the protocols observed in the network traffic, along with their corresponding state;
src_byte_count: the number of bytes sent from the source to the destination;
dst_byte_count: the number of bytes sent from the destination to the source;
src_packets: the number of packets sent from the source to the destination;
dst_packets: the number of packets sent from the destination to the source;
ipfix: any IP Flow information Export (IPFIX) data for the traffic, as a dictionary;
src_payload_ref: the bytes sent from the source to the destination;
dst_payload_ref: the bytes sent from the destination to the source.

The depth first search then discovers two child objects from object 721, including a source address and a destination address. Object 631 represents the source address, and object 632 represents the destination address. In user interface 700, line 731 represents the source internet protocol (IP) address, and line 732 represents the destination IP address. The context information in lines 731 and 732 include the IP addresses and a risk score. The risk score is a normalized value that is produced from processing the threat intelligence information, including internet scans and spam collection from across the globe. At a high level, this score reflects the potential maliciousness and risk of that IP. The risk score is represented as a circle or triangle in the example shown in FIG. 7.

Because objects 631, 632 are leaf nodes in the tree data structure of FIG. 6, the depth-first search then proceeds to the next relationship of object 612, which indicates that process 612 was created by a user account represented by object 622. Line 722 in user interface 700 indicates that the process of line 712 was created by a user account. Line 722 presents context information indicating that the identifier of the user account is "SYSTEM."

Because object 622 is a leaf node in the tree data structure of FIG. 6, the depth-first search then proceeds to the next relationship of object 612, which indicates that process 612 ran file 623. Line 723 in user interface 700 indicates that the process of line 712 ran the file of line 723. In addition, line 723 presents context information for the file, including the file name and a file hash.

With object 623 being the last leaf node of the tree data structure under root 0, object 601, the depth-first next considers root 1, object 602 in FIG. 6. Line 702 in user interface 700 represents the domain name. Line 702 also presents context information, including the Uniform Resource Locator (URL) of the domain name.

Other examples of objects that may be observed and their properties are described in the STIX™ language specification at http://docs.oasis-open.org/cti/stix/v2.0/csprd01/part4-cyber-observable-objects/stix-v2.0-csprd01-part4-cyber-observable-objects.html.

As seen in the example depicted in FIG. 7, user interface 700 presents the relationships between objects in the cyber threat data as indents, where a child object is presented below and indented from the parent object. The context presented for each object is selected based on the cyber threat data that is relevant for the objects and their relationship. In one embodiment, the mechanism of the illustrative embodiment may use a rule engine to apply rules for selecting what information is presented for each relationship between objects.

Figure 8:
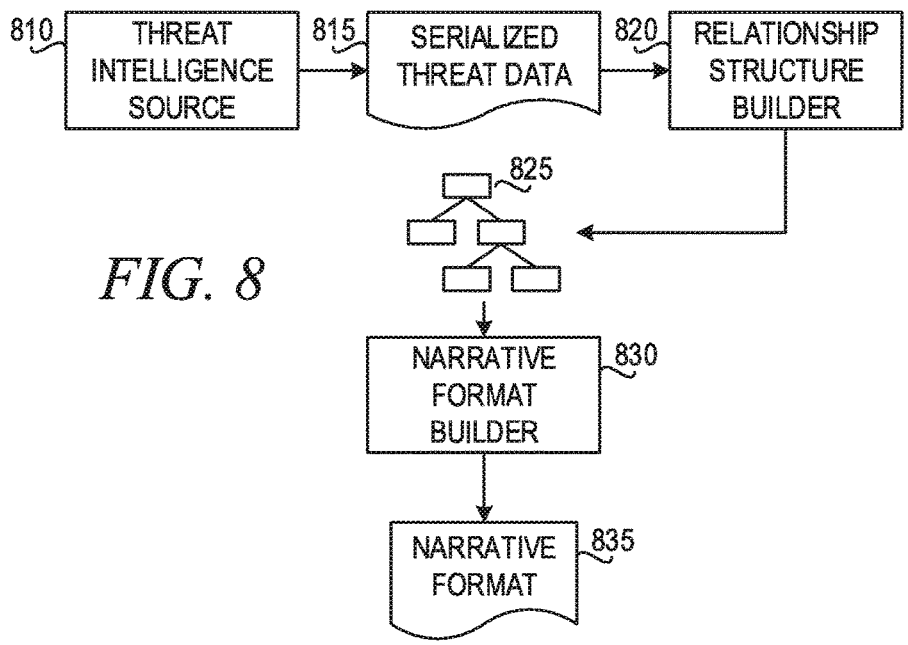
FIG. 8 is a block diagram of a mechanism for displaying cyber threat data in a narrative format in accordance with an illustrative embodiment.

FIG. 8 is a block diagram of a mechanism for displaying cyber threat data in a narrative format in accordance with an illustrative embodiment. A threat intelligence source 810 generates serialized threat data 815. Examples of sources for cyber threat intelligence include open source feeds (e.g. Department of Homeland Security, FBI, VirusTotal), in-house threat intelligence, online communities, commercial services, and dark web intelligence. Threat intelligence feeds can also be consumed through products for example: AlienValut®, FireEye®, IBM X-Force® Exchange. Relationship structure builder engine 820 parses the serialized cyber threat data 815 and builds a tree data structure 825 that represents relationships between objects in the serialized cyber threat data 815. Then, narrative format builder engine 830 performs a depth-first search of the tree data structure 825 and generates a narrative format display 835. The mechanism visually displays the relationships already mapped to their respective references and displays this information in a narrative way to highlight these relationships in a hierarchical way to help with legibility and to increase understanding.

FIG. 9 is a flowchart illustrating operation of a mechanism for displaying cyber threat data in a narrative format in accordance with an illustrative embodiment. Operation begins (block 900), and the mechanism receives threat information in a serialized format (block 901). In one embodiment, the serialized cyber threat data is received as a STIX™ language cyber threat data file. The mechanism then identifies objects in the serialized cyber threat data (block 902).

Then, the mechanism examines a first/next object in the serialized cyber threat data (block 903). The mechanism determines whether the given object has any references to a child object (block 904). If the given object has one or more references to a child object, then the mechanism maps the relationships between the given object and the one or more child objects (block 905). Thereafter, or if the given object does not have any references in block 904, the mechanism determines whether the given object is the last object in the serialized cyber threat data (block 906). If the given object is not the last object, then operation returns to block 903 to examine the next object.

If the given object is the last object in the serialized cyber threat data in block 906, then the mechanism generates a tree data structure representing the object relationships in a hierarchical format (block 907). Then, the mechanism performs a depth-first traversal of the tree data structure (block 907), extracts pertinent information from each object (block 908), and generates a narrative form of the cyber threat information (block 910). Thereafter, operation ends (block 911).

The narrative form of the cyber threat information presents the relationships in a hierarchical format, such as by indentation or other techniques, with pertinent context information. Each line of the narrative format presents an object and the relationship to its parent object. For example, a line for a process may indicate that it was created by a parent process, and a line for a connection may indicate that it was opened by a parent process and have child objects for the source address and destination address. The analyst may then easily view the narrative format to determine that a given process ran a file and created a child process, which in turn opened a connection. This information may be difficult or tedious to discover from serialized cyber threat data, which opens the analyst up to a risk of human error.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication-based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for displaying cyber threat data in a narrative format, the method comprising:
   receiving a cyber threat information file, wherein the cyber threat information file comprises cyber threat data in a serialized format, wherein the cyber threat data comprises text in a structured cyber threat information language;
   processing the cyber threat information file to extract, from the cyber threat data, portions of text corresponding to a plurality of objects and a plurality of relationships between objects, wherein each object in the plurality of objects corresponds to an extracted portion of text in the cyber threat data referencing one of a process or data structure, wherein the objects in the plurality of objects are identified in the cyber threat information file during the processing, and wherein extracting the portions of text corresponding to the plurality of relationships comprises, for one or more of the identified objects in the cyber threat information file, extracting one or more references, within text of the one or more identified objects, to identifiers of other objects in the plurality of objects;
   generating a hierarchical data structure based on the identified plurality of objects and the identified plurality of relationships, wherein each node of the hierarchical data structure represents a corresponding object in the plurality of objects and each edge in the hierarchical data structure represents a reference to a relationship between a parent object and a child object, in the plurality of objects;
   generating a graphical user interface, based on the hierarchical data structure, presenting the cyber threat data in a narrative format, wherein the graphical user interface presents the plurality of objects in the narrative format in a hierarchy corresponding to a structure of the hierarchical data structure, wherein the narrative format is a non-graph textual representation that comprises, for each relationship between a parent object and a corresponding child object, text specifying a type of relationship between the parent object and the corresponding child object, and presents the non-graph textual representation formatted with text corresponding to child object references offset from specifies an action performed by the parent object on the child object; and
   presenting the graphical user interface via a computing display device.

2. The method of claim 1, wherein the graphical user interface presents a first object corresponding to a given process, in the narrative format, with context information including a name and a process identifier of the given process.

3. The method of claim 2, wherein the graphical user interface presents, in the narrative format, a first file as a child object of the first object corresponding to the given process, an indicator of a relationship between the given process and the first file, and context information including a name of the first file, wherein the relationship between the given process and the first file indicates that the given process ran the file.

4. The method of claim 2, wherein the graphical user interface presents, in the narrative format, a child process as a child object of the first object corresponding to the given process, an indicator of a relationship between the given process and the child process, and context information including a name and a process identifier of the child process and a date the child process was created, wherein the relationship between the given process and the child process indicates that the given process created the child process.

5. The method of claim 2, wherein the graphical user interface presents, in the narrative format, a connection, and a relationship between the first object corresponding to the given process and the connection that indicates the given process opened the connection.

6. A computer program product comprising a computer readable storage medium having a computer readable program stored therein, wherein the computer readable program, when executed on a computing device, causes the computing device to:
   receive a cyber threat information file, wherein the cyber threat information file comprises cyber threat data in a serialized format, wherein the cyber threat data comprises text in a structured cyber threat information language;
   process the cyber threat information file to extract, from the cyber threat data, portions of text corresponding to a plurality of objects and a plurality of relationships between objects, wherein each object in the plurality of objects corresponds to an extracted portion of text in the cyber threat data referencing one of a process or data structure, wherein the objects in the plurality of objects are identified in the cyber threat information file during the processing, and wherein extracting the portions of text corresponding to the plurality of relationships comprises, for one or more identified objects in the cyber threat information file, extracting one or more references, within the text of the one or more identified objects, to identifiers of other objects in the plurality of objects;
   generate a hierarchical data structure based on the identified plurality of objects and the identified plurality of relationships, wherein each node of the hierarchical data structure represents a corresponding object in the plurality of objects and each edge in the hierarchical data structure represents a reference to a relationship between a parent object and a child object, in the plurality of objects;
   generate a graphical user interface, based on the hierarchical data structure, presenting the cyber threat data in a narrative format, wherein the graphical user interface presents the plurality of objects in the narrative format in a hierarchy corresponding to a structure of the hierarchical data structure, wherein the narrative format is a non-graph textual representation that comprises, for each relationship between a parent object and a corresponding child object, text specifying a type of relationship between the parent object and the corresponding child object, and presents the non-graph textual representation formatted with text corresponding to child object references offset from specifies an action performed by the parent object on the child object; and present the graphical user interface via a computing display device.

7. The computer program product of claim 6, wherein the graphical user interface presents a first object corresponding to a given process, in the narrative format, with context information including a name and a process identifier of the given process.

8. The computer program product of claim 7, wherein the graphical user interface presents, in the narrative format, a first file as a child object of the first object corresponding to the given process, an indicator of a relationship between the given process and the first file, and context information including a name of the first file, wherein the relationship between the given process and the first file indicates that the given process ran the file.

9. The computer program product of claim 7, wherein the graphical user interface presents, in the narrative format, a child process as a child object of the first object corresponding to the given process, an indicator of a relationship between the given process and the child process, and context information including a name and a process identifier of the child process and a date the child process was created, wherein the relationship between the given process and the child process indicates that the given process created the child process.

10. The computer program product of claim 7, wherein the graphical user interface presents, in the narrative format, a connection, and a relationship between the first object corresponding to the given process and the connection that indicates the given process opened the connection.

11. An apparatus comprising:
a processor; and
a memory coupled to the processor, wherein the memory comprises instructions which, when executed by the processor, cause the processor to:
receive a cyber threat information file, wherein the cyber threat information file comprises cyber threat data in a serialized format, wherein the cyber threat data comprises text in a structured cyber threat information language;
process the cyber threat information file to extract, from the cyber threat data, portions of text corresponding to a plurality of objects and a plurality of relationships between objects, wherein each object in the plurality of objects corresponds to an extracted portion of text in the cyber threat data referencing one of a process or data structure, wherein the objects in the plurality of objects are identified in the cyber threat information file during the processing, and wherein extracting the portions of text corresponding to the plurality of relationships comprises, for one or more identified objects in the cyber threat information file, extracting one or more references, within the text of the one or more identified objects, to identifiers of other objects in the plurality of objects;
generate a hierarchical data structure based on the identified plurality of objects and the identified plurality of relationships, wherein each node of the hierarchical data structure represents a corresponding object in the plurality of objects and each edge in the hierarchical data structure represents a reference to a relationship between a parent object and a child object, in the plurality of objects;
generate a graphical user interface, based on the hierarchical data structure, presenting the cyber threat data in a narrative format, wherein the graphical user interface presents the plurality of objects in the narrative format in a hierarchy corresponding to a structure of the hierarchical data structure, wherein the narrative format is a non-graph textual representation that comprises, for each relationship between a parent object and a corresponding child object, text specifying a type of relationship between the parent object and the corresponding child object, and presents the non-graph textual representation formatted with text corresponding to child object references offset from specifies an action performed by the parent object on the child object; and
present the graphical user interface via a computing display device.

12. The apparatus of claim 11, wherein the graphical user interface presents objects corresponding to a given process, in the narrative format, with context information including a name and a process identifier of the given process.

13. The apparatus of claim 12, wherein the graphical user interface presents, in the narrative format, a first file as a child object of the first object corresponding to the given process, an indicator of a relationship between the given process and the first file, and context information including a name of the first file, wherein the relationship between the given process and the first file indicates that the given process ran the file.

14. The apparatus of claim 12, wherein the graphical user interface presents, in the narrative format, a child process as a child object of the first object corresponding to the given process, an indicator of a relationship between the given process and the child process, and context information including a name and a process identifier of the child process and a date the child process was created, wherein the relationship between the given process and the child process indicates that the given process created the child process.

15. The apparatus of claim 12, wherein the graphical user interface presents, in the narrative format, a connection, and a relationship between the first object corresponding to the given process and the connection that indicates the given process opened the connection.

16. The method of claim 1, wherein the hierarchical data structure is a tree data structure, and wherein generating the user interface comprises:
performing a depth-first search of relationships between objects in the tree data structure and extracting context information pertinent to the relationships between the objects, wherein the graphical user interface indicates the relationships between parent objects and child objects graphically as links between the parent objects and child objects, based on the tree data structure, and presents indicators, in association with corresponding links between parent objects and child objects, wherein the indicators specify a relationship type between the parent object and the child object of the corresponding link.

17. The computer program product of claim 6, wherein the hierarchical data structure is a tree data structure, and wherein generating the user interface comprises:
performing a depth-first search of relationships between objects in the tree data structure and extracting context information pertinent to the relationships between the objects, wherein the graphical user interface indicates the relationships between parent objects and child objects graphically as links between the parent objects and child objects, based on the tree data structure, and presents indicators, in association with corresponding links between parent objects and child objects, wherein the indicators specify a relationship type between the parent object and the child object of the corresponding link.

18. The apparatus of claim 11, wherein the hierarchical data structure is a tree data structure, and wherein generating the user interface comprises:

performing a depth-first search of relationships between objects in the tree data structure and extracting context information pertinent to the relationships between the objects, wherein the graphical user interface indicates the relationships between parent objects and child objects graphically as links between the parent objects and child objects, based on the tree data structure, and presents indicators, in association with corresponding links between parent objects and child objects, wherein the indicators specify a relationship type between the parent object and the child object of the corresponding link.

19. The method of claim 1, wherein the non-graph textual representation comprises, for each pairing of parent object and child object, context information for the relationship between the parent object and the child object, wherein the context information comprises a subset of properties, selected from a set of properties, and their values from the cyber threat data, which are determined to be relevant to the specific parent object, specific child object, and their specific type of relationship.

20. The computer program product of claim 6, wherein the non-graph textual representation comprises, for each pairing of parent object and child object, context information for the relationship between the parent object and the child object, wherein the context information comprises a subset of properties, selected from a set of properties, and their values from the cyber threat data, which are determined to be relevant to the specific parent object, specific child object, and their specific type of relationship.

* * * * *